United States Patent
Gross et al.

[11] Patent Number: 5,149,481
[45] Date of Patent: Sep. 22, 1992

[54] METHOD OF MANUFACTURING THERMOPLASTIC SHEET OR FILM

[75] Inventors: Heinz Gross, Rossdorf; Andreas Fetzer, Bickenbach; Günther Dickhaut, Riedstadt, all of Fed. Rep. of Germany

[73] Assignee: Rohm GmbH Chemische Fabrik, Darmstadt, Fed. Rep. of Germany

[21] Appl. No.: 712,424

[22] Filed: Jun. 10, 1991

[30] Foreign Application Priority Data

Jun. 9, 1990 [DE] Fed. Rep. of Germany ....... 4018530

[51] Int. Cl.$^5$ ............................................. B29C 47/90
[52] U.S. Cl. ................................. 264/210.2; 264/40.6; 264/40.7; 264/237; 264/280; 264/210.5; 425/327; 425/377; 425/373
[58] Field of Search .......... 264/210.5, 327, 280, 264/210.2, 210.1, 237, 348, 175, 40.6, 40.7; 425/325, 373, 377, 374, 379.1, 327, 378.1

[56] References Cited

U.S. PATENT DOCUMENTS

| | | | |
|---|---|---|---|
| 2,791,801 | 5/1957 | Szantay | 264/210.2 |
| 4,734,229 | 3/1988 | Johnson et al. | 264/280 |
| 4,826,560 | 5/1989 | Held | 425/371 |
| 4,858,139 | 8/1989 | Wirtz | 264/210.2 |
| 4,859,392 | 8/1989 | Vetter | 264/210.2 |
| 4,874,571 | 10/1989 | Müller | 264/237 |

FOREIGN PATENT DOCUMENTS

| | | | |
|---|---|---|---|
| 2250560 | 5/1974 | Fed. Rep. of Germany | 425/325 |
| 62-48523 | 3/1987 | Japan | 264/210.1 |
| 62-140817 | 6/1987 | Japan | 264/210.5 |
| 62-284719 | 12/1987 | Japan | 264/210.1 |

*Primary Examiner*—Jeffery Thurlow
*Attorney, Agent, or Firm*—Oblon, Spivak, McClelland, Maier & Neustadt

[57] ABSTRACT

An extruded, smooth finished solid sheet or film of thickness <1 mm is prepared from a thermoplastic plastic having a glass transition temperature >50° C., by extruding the plastic in the thermoplastic state through a slot nozzle to form a flat extruded strip, which is introduced into the roll gap of a roll stack having a smoothed upper roll and a lower roll, with the upper roll being maintained at a temperature below the glass transition temperature of the thermoplastic plastic and with the lower roll being maintained at a temperature in the plastic state domain of the thermoplastic plastic, and, after exiting the roll gap, the extruded strip is moved resting on a smooth-finished endless belt which passes around the lower roll, thereby smoothing the surface of the strip; and cooling said extruded strip below the glass transition temperature.

4 Claims, 1 Drawing Sheet

METHOD OF MANUFACTURING THERMOPLASTIC SHEET OR FILM

BACKGROUND OF THE INVENTION

1. Field of the Invention

The present invention relates to a method of manufacturing an extruded, smooth finished solid sheet or film of thickness <1 mm, comprised of a thermoplastic having a glass transition temperature >50° C., by extruding the plastic in a thermoplastic state through a slot nozzle to form a flat extruded strip, and smoothing the surfaces of the strip. The term "solid" here indicates that the extruded and smoothed strip (sheet or film) has no internal voids; hereinafter, for simplicity, the terms "sheet" and "film" will indicate corresponding strips which are solid.

DESCRIPTION OF THE BACKGROUND

Smooth finished extruded sheets of amorphous thermoplastic are customarily produced by passing a slot-extruded strip through polishing roll stacks. In the gap between the polishing rolls the surfaces of the strip are abruptly vitrified via the rolls which are at a temperature below the glass transition temperature, so that only the interior of the strip remains in the thermoplastic state. In this process, an excess of the molten thermoplastic may be forced out of the roll gap against the direction of flow, forming a bead-like prominence on the strip in front of said gap.

If the strip is thinner than a certain thickness, the vitrified layers meet in the central plane, and therefore there is no longer any part of the thickness of the strip which is capable of flow; accordingly, the excess can no longer be forced out of the roll gap. As a result, the compression forces which develop in the roll gap are so great that the surfaces of the rolls, or the bearings or stands of said rolls, may suffer damage. Such compression forces cannot be eliminated merely by increasing the temperature of the melt or increasing the turning speed of the roll stack. In practice it is not possible to avoid small thickness differences over the width of the extruded strip. If one attempts to avoid having any excess extruded molding compound, a hazard which may arise in that the roll gap will not be fully occupied by the strip over the entire width dimension of the gap, resulting in failure to achieve the desired smoothing. Accordingly, it is impracticable to attempt to achieve the ideal state of a minimally thick bead having a uniform thickness over the entire width of the strip ahead of the roll gap, in the case of an intended thickness of the strip which is below a certain thickness. Smooth finished extruded sheets or films thinner than this cannot be produced by customary polishing roll stack technology.

Ger. Pat. 2,432,778 shows that thermoplastic films with advantageous surface properties, outstanding dimensional stability, and nearly isotropic properties may be produced by taking an extruded strip of thermoplastic material, which has been extruded under minimal compression conditions, and feeding it immediately after it emerges from the extruder to a takeup device comprised of two superposed synchronously driven endless conveyor belts between which the strip is compressed, widened, and pressed flat, wherewith the strip is carried along with and adheres to said belts and while disposed between said belts is cooled to below its glass transition temperature. At the entrance to the takeup device both conveyor belts are maintained at a temperature higher than the glass transition temperature of the plastic, and they are cooled in equal fashion in the later part of their excursion. The thickness tolerance achieved is 0.05–0.1 mm over a lateral dimension of c. 60 mm.

Jap. Pat. App. 57/014,065 (1983) discloses an extrusion method wherein the extruded strip of thermoplastic is rested on an endless conveyor belt after exiting the nozzle, and is allowed to cool there. No means of smoothing the free upper surface of the strip are provided. The result is a strip with an underside which is flat and amenable to good adhesive bonding. A need continues to exist for an improved method of manufacturing extruded thermoplastic film.

SUMMARY OF THE INVENTION

Accordingly, one object of the present invention is to provide a method of manufacturing an extruded, smooth finished solid sheet or film of thickness <1 mm, comprised of thermoplastic with a glass transition temperature >50° C.

Briefly, this object and objects of the present invention as hereinafter will become more readily apparent can be attained by a method of manufacturing an extruded, smooth finished solid sheet or film of thickness less than 1 mm from a thermoplastic plastic having a glass transition temperature >50° C., by extruding the plastic in a thermoplastic state through a slot nozzle to form a flat extruded strip, which is introduced into the roll gap of a polishing roll stack having a smoothed upper roll and a lower roll, with the upper roll being maintained at a temperature below the glass transition temperature of the thermoplastic plastic and with the lower roll being maintained at a temperature in the plastic state domain of the thermoplastic plastic, and, after exiting the roll gap, the extruded strip is passed onto a smooth-finished endless belt which passes around the lower roll, thereby smoothing the surfaces of the strip; and cooling said extruded strip below the glass transition temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
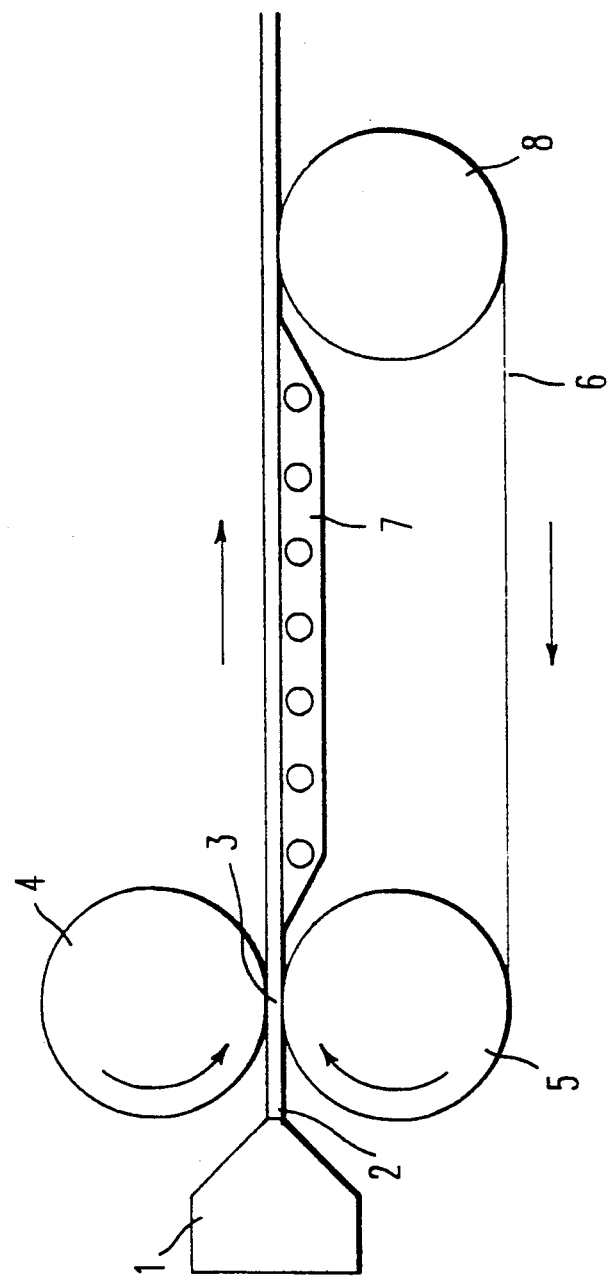
FIG. 1 is a schematic cross section of an extrusion and smoothing apparatus for conducting the present invention.

In the method commonly used for manufacturing smoothed plastic strips, the plastic is extruded in a thermoplastic state through a slot nozzle 1 to form a flat strip 2, and the surfaces of the extruded strip is smoothed by introducing the strip into the roll gap 3 of a roll stack comprising an upper roll 4, which is smoothed, and a lower roll 5, with the rolls being maintained at a temperature below the glass transition temperature of the thermoplastic.

According to the invention, the lower roll 5 is maintained at a temperature in the plastic state domain of the thermoplastic plastic, and the extruded strip after exiting the roll gap is moved resting on a smooth-finished endless conveyor belt 6 which has been passed around the lower roll 5, and said extruded strip is cooled to below the glass transition temperature. As long as the endless belt 6 rests on the lower roll 5 its temperature is approximately the same as that of said lower roll.

Because one side of the extruded strip is maintained in the thermoplastic state domain during the smoothing in the roll gap, that side remains plastically deformable, such that the roll gap remains continuously filled with the plastic melt, and the excess of the melt can be forced out on the inlet side of the roll gap. This ensures that the strip will continuously rest against the upper roll of the roll stack and against the endless belt which runs around the lower roll, and that no major pressure buildup will occur in the roll gap. The pressure will be limited to a level determined by:

the melt viscosity of the thermoplastic layer, and
the speed of the belt.

The forming and smoothing of the strip in the roll gap under partially plastic conditions enables a sheet or film <1 mm thick to be manufactured which is smoothed on both sides and has a uniformity and thickness accuracy which could not be achieved with ordinary roll stacks. The resulting sheet or film is practically free from orientations and the resulting optical birefringence.

Basically the inventive method may be carried out in any temperature range in which thermoplastics are plastically processible. There are practical reasons for limiting the invention to plastics with glass transition temperatures >50° C. Plastics with glass transition temperatures below this are more or less sticky at room temperature. As a rule, there is no practical interest in smoothing the surface of such materials.

Suitable plastics are in particular hard thermoplastics which undergo vitrification from the fluid state; e.g., polymethylmethacrylate (PMMA), polystyrene (PS), polycarbonate polyvinyl chloride (PVC), polyvinylidene chloride (PVDC), acrylonitrile-butadiene-styrene (ABS), sytrene-acrylonitrile, polyethersulfone polyethylene terephthalate (PET), polysulfone, polyetherimide, polyether ether ketone, and polymethacrylatemethyl imide (see DIN 7728). They may be colored or filled. The present method may also be employed for the coextrusion of diverse thermoplastic plastics or of plastics in different formulations etc., to form laminated strips.

The present method also enables manufacture of sheets of thickness >1 mm; however in this thickness range ordinary calenders may be employed to accomplish uniform smoothing of both surfaces. The special advantages of the invention are evident only with strip thicknesses <1 mm. Typical strip thicknesses of the smoothed sheet or film are between 0.01 and 1 mm, particularly 0.05-0.5 mm.

Preferably, a sheet or film with the following qualities is produced by the present method:

1. An optical birefringence path difference (retardation) not exceeding 50 nm in a single pass through the sheet or film;
2. Variations in thickness not exceeding 0.05 mm in the course of dimensions of up to 700×650 mm;
3. Variations in thickness not exceeding 0.04 mm, preferably not exceeding 0.025 mm, in the course of dimensions of up to 300×300 mm;
4. Maximum surface roughness (Rmax according to DIN 4768) <300 nm on at least one surface, and/or mean surface roughness (Rz according to DIN 4768) <150 nm, preferably <100 nm;
5. Surface roughness at the center (Ra according to DIN 4768) <40 nm, preferably <25 nm;
6. Curvature <1.6 mm in the course of dimensions of up to 300×300 mm (where curvature is defined as the maximum distance of the free-lying sheet or film from a plane support surface);
7. Shrinkage of not more than 16% in the extrusion direction and/or not more than 5% transversely to the extrusion direction, when stored 30 min at 160° C.

Obviously, a prerequisite for achieving these surface qualities is that rolls 4 and 5, and the endless belt 6, have corresponding qualities and accordingly should be appropriately configured and adjusted In order to ensure problem-free formation of the extruded strip, the strip of thermoplastic should be advanced from the extrusion nozzle at a speed such that the bead of thermoplastic molding compound on the inlet side of the roll gap is continuously maintained at a uniform, minimal size. In this connection it is desirable to continuously monitor the size of the bead, and to adjust the speed of extrusion so as to continuously maintain a uniformly small bead. According to Ger. Pat. 3,730,043, this can be accomplished, e.g., by feeding the molding compound into the extrusion nozzle by a melt pump, and coupling the output rate of the pump with the speed of the roll stack.

The controlling temperatures for adjusting the surface temperatures of the strip in the roll gap are the temperatures of the rolls (4, 5). The surface temperature T at the point of contact of the strip is determined by the temperature $T_s$ and thermal penetrability $b_s$ of the melt, and the temperature $T_w$ and thermal penetrability $b_w$ of the material of the rolls and conveyor belt, according to the following formula:

$$T = (T_s \cdot b_s + T_w \cdot b_w)/(b_s + b_w).$$

Here $T_s$ is the melt temperature ahead of the roll gap, and $T_w$ is the roll temperature ahead of the roll gap. Because it is desired to have the second surface of the strip remain in the thermoplastic state, it is advantageous to have the deflecting roll 5 and the belt 6 running on roll 5 maintained at approximately the temperature of the melt. In any event, the temperature must be in the thermoplastic range of the plastic. Known means may be used for adjusting and monitoring the roll temperatures.

In processing bisphenol-A polycarbonate and other plastics with comparable processing characteristics, for example, the upper roll is maintained at 60°-140° C. and the lower roll and the endless belt running over the lower roll are maintained at 160°-300° C.

After exiting the roll gap, and possibly after transiting a hot relaxation zone, the endless belt with the strip resting on it enters the cooling zone, where the belt 6 slides along over the cooling plate 7. Plate 7 should have a planar surface, to avoid deformations in the strip as the strip cools. Advantageously, a coolant is passed through plate 7 in the direction opposite to the movement of the belt 6, so that the lowest temperature of the plate is at the end thereof which is farthest from the roll stack. At said end, the temperature of the strip should now be below its glass transition temperature, over the entire thickness of the strip. During the cooling, the lower side of the strip vitrifies in a smoothed state, and in the process separates from the belt. The distant deflecting roll 8 directs the endless belt back toward the roll stack, while the finished extruded and smoothed strip leaves the belt. As desired, the strip may be coiled or may be cut into pieces of desired length.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of manufacturing an extruded, smooth finished solid sheet or film of thickness <1 mm, from a thermoplastic plastic having a glass transition temperature >50° C., by extruding the plastic in a thermoplastic state through a slot nozzle to form a flat extruded strip, which is introduced into the roll gap of a roll stack having a smoothed upper roll and a lower roll, with the upper roll being maintained at a temperature below the glass transition temperature of the thermoplastic plastic and with the lower roll being maintained at a temperature in the plastic state domain of the thermoplastic plastic, and, after exiting the roll gap, the extruded strip is moved resting on a smooth-finished endless belt which passes around the lower roll, thereby smoothing the surfaces of the strip; and cooling said extruded strip below the glass transition temperature.

2. The method according to claim 1, wherein the strip of thermoplastic plastic is conveyed out of the extrusion nozzle at a speed such that the strip forms a bead on the inlet side of the roll gap, and such that the entire width of the strip lies continuously against both rolls.

3. The method according to claim 1, wherein the plastic is polymethylmethacrylate (PMMA), polystyrene (PS), PC, polyvinylchloride (PVC), polyvinylidene chloride (PVDC), acrylonitrile-butadiene-styrene (ABS), SAN, PES, polyethylene terephthalate (PET), PSU, PEI, PEEK or PMMI.

4. The method according to claim 1, wherein the upper roll is maintained at a temperature of 60°-140° C. and the lower roll and endless belt over the lower roll are maintained at a temperature of 160°-300° C.

* * * * *